United States Patent [19]

Voelk et al.

[11] Patent Number: 4,608,758
[45] Date of Patent: Sep. 2, 1986

[54] ERROR CORRECTION SYSTEM FOR MEASURING INSTRUMENT

[75] Inventors: Karl-Hermann Voelk, St. Georgen; Karl-Heinz Wehrstein, Palling, both of Fed. Rep. of Germany

[73] Assignee: Dr. Johannes Heidenhain GmbH, Traunreut, Fed. Rep. of Germany

[21] Appl. No.: 583,692

[22] Filed: Feb. 27, 1984

[30] Foreign Application Priority Data

Mar. 30, 1983 [DE] Fed. Rep. of Germany ....... 3311562

[51] Int. Cl.$^4$ ............................................. G01B 11/04
[52] U.S. Cl. ................................ 33/125 R; 33/125 C
[58] Field of Search ............... 33/125 R, 125 A, 125 C

[56] References Cited

U.S. PATENT DOCUMENTS 4,430,799 2/1984 Affa .

FOREIGN PATENT DOCUMENTS 3136981 9/1981 Fed. Rep. of Germany .

OTHER PUBLICATIONS

Dr. Johannes Heidenhain, Publication 208 40911.15.10,82 H printed in West Germany, Anderungen vorbehalten, Oct. 1982 "Inkrementales Langenmesssystem LS107".

Primary Examiner—Harry N. Haroian
Attorney, Agent, or Firm—Willian Brinks Olds Hofer Gilson & Lione

[57] ABSTRACT

A measuring system includes a measuring graduation and scanning unit which scans the measuring graduation. The scanning unit and the measuring graduation are connected to respective ones of two objects, the position of which is to be measured. An error correction system which includes an error correction profile is provided for the correction of errors such as graduation errors and/or machine errors. The position of the correction profile is adjustable transversely to the measuring direction by means of eccentrics. Each of the eccentrics defines an index mark which is used with an error correction scale to indicate the position of the eccentric and therefore the deflection of the correction profile. In order to facilitate reproduceable error correction, the index marks are each defined by a respective index mark carrier which is mounted to the eccentric in an adjustable manner such that the index marks can be repositioned to define any arbitrary orientation of the eccentrics as a new zero position.

8 Claims, 5 Drawing Figures

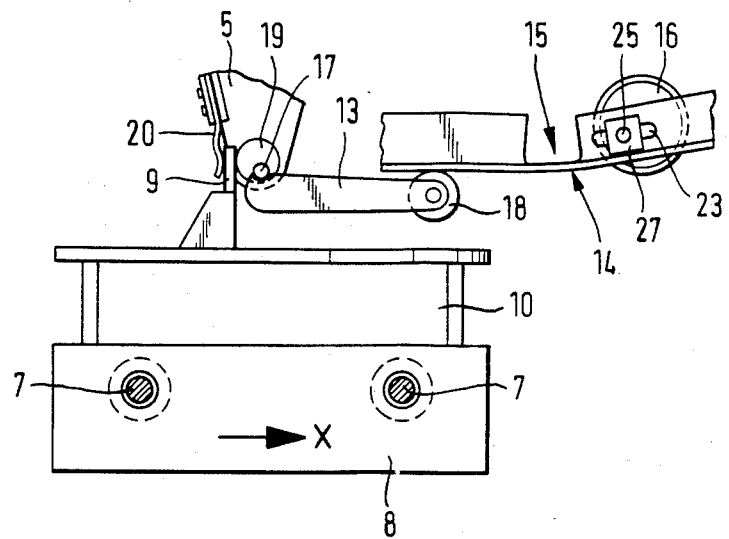
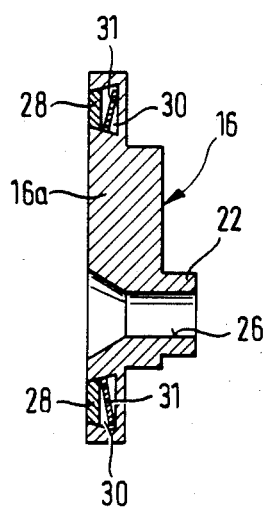
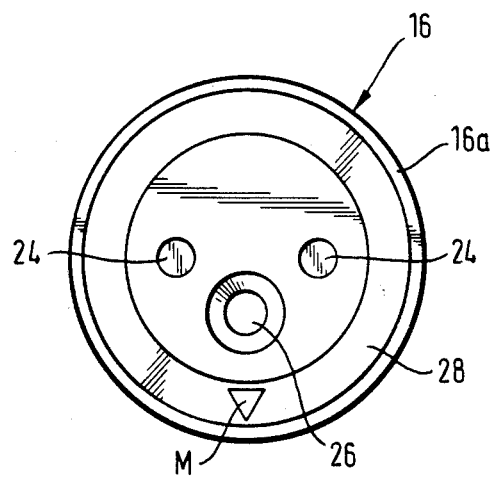

4,608,758

ERROR CORRECTION SYSTEM FOR MEASURING INSTRUMENT

BACKGROUND OF THE INVENTION

The present invention relates to an error correction system for a measuring instrument of the type comprising a measuring scale and a scanning unit positioned to scan the scale, wherein the error correction system includes an error correction profile, at least one adjusting element for adjusting the position of the correction profile transversely to the measuring direction, a transfer element coupled between the scanning unit and an object to be measured in order to vary the separation therebetween in response to the profile, and an error correction scale positioned adjacent to the adjusting element.

German Patent DE-PS No. 31 36 981 discloses a length measuring system in which an error correction profile is provided for error correction. This profile is adjustable by means of eccentrics transversely with respect to the measuring direction.

The publication of the firm of Dr. Johannes Heidenhain GmbH entitled "Inkrementales LangenmeBsystem LS 107" (October, 1982) discloses a length measuring system in which an error correction profile is adjustable by means of eccentrics transversely to the measuring direction for error correction. In order to facilitate adjustment of the error correction profile the eccentrics each define an index mark which cooperates with a fixed scale on the housing of the measuring system to indicate the position of the individual eccentrics.

In general, the errors to be corrected by such an error correction system are made up of two general classes of errors: (1) graduation errors or division errors of the measuring graduation of the measuring system, and (2) machine errors such as guidance errors of the machine parts, the position of which is to be calibrated. Ordinarily, such a measuring system is calibrated prior to delivery, for example by means of a laser interferometer, and graduation errors of the measuring graduation are corrected by adjusting the error correction profile by means of the eccentrics. As a general matter, after the correction of these division or graduation errors at least a portion of the adjusting marks fixedly positioned on the eccentrics deviate from the zero line of the fixed scale. After such a measuring system has been attached to a processing or measuring machine in general it will be necessary to correct the system again for potential guidance errors of the machine parts to be measured. Likewise, this is done by adjusting the position of the error correction profile by means of the eccentrics. For example, a previously measured error record can be used to set the eccentrics in order to correct for guidance errors. The entry of corrections for such guidance errors is complicated however by the fact that not all of the index marks of the eccentrics start out at the zero line of the scale. As explained above this is due to the fact that the fixed index marks have at least in part been moved from the zero line of the fixed scale in order to adjust for graduation errors. For this reason, a reproduceable and an accurate setting of the error correction profile in correspondence with the guidance error correction is difficult and not always free of error, even with later readjustments.

SUMMARY OF THE INVENTION

The present invention is directed to a measuring system of the general type described above which is provided with an improved system for making reproduceable error corrections.

According to this invention, a measuring system of the general type described initially above is provided with an index mark carrier which defines an index mark that cooperates with the error correction scale to indicate the position of the adjusting element. Means are provided for adjustably mounting the index mark carrier to the adjusting element such that the relative position of the index mark carrier with respect to the adjusting element can be varied. This invention can be used to reset the index mark carrier to position all of the index marks to the zero line of the error correction scale after any graduation errors have been corrected.

The present invention provides the important advantages that precisely reproduceable error correction can be obtained in a remarkably simple manner. The individual error components (the graduation error component and the guidance error component) can be corrected independently of one another and the error correction scale can be completely utilized in the correction of each type of error. This is because the index marks can be repositioned to the zero position of the error correction scale after the graduation errors have been corrected and before the guidance errors are corrected. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 1b is a cross-sectional view of the measuring system of FIG. 1a.

FIG. 2 is a schematic representation of portions of the error correction system of the embodiment of FIGS. 1a and 1b.

FIG. 3a is a cross-sectional view of one of the eccentrics of the embodiment of FIGS. 1a and 1b.

FIG. 3b is a plan view of one of the eccentrics of the embodiment of FIGS. 1a and 1b.

DETAILED DESCRIPTION OF THE PRESENTLY PREFERRED EMBODIMENTS

Figure 1B:
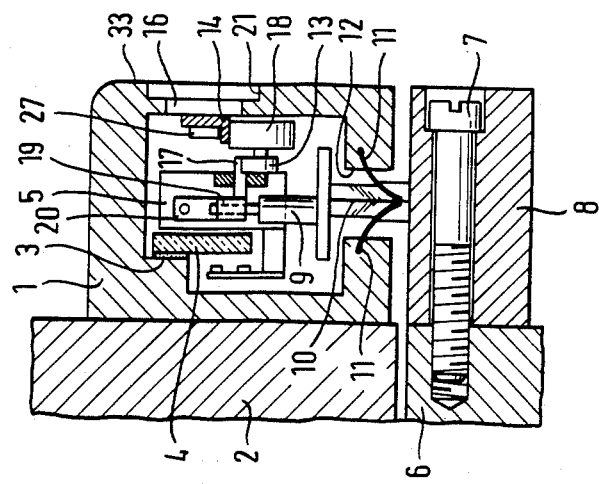
Figure 1A:
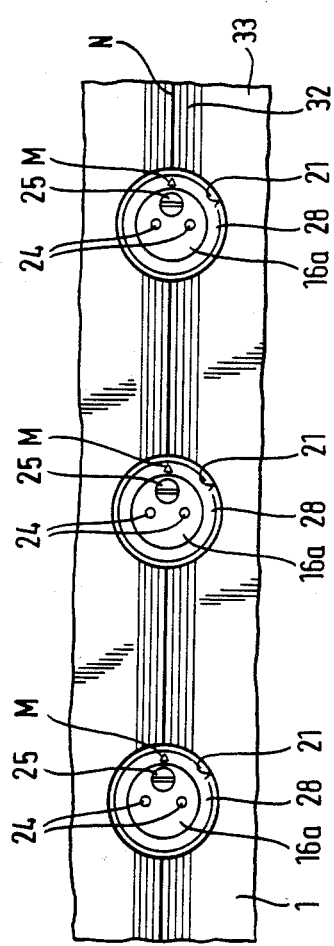
FIG. 1a is a fragmentary longitudinal side view of a portion of a length measuring system which incorporates the presently preferred embodiment of this invention.

Turning now to the drawings, FIGS. 1a and 1b show a fragmentary longitudinal side view and a cross-sectional view of an encapsulated length measuring system which incorporates a presently preferred embodiment of this invention. This measuring system includes a housing 1 which is fastened in an arbitrary manner to a bed 2 of a processing or measuring machine. A measuring scale 4 is mounted by means of an adhesive layer 3 to an inner surface of the housing 1. The scale 4 defines a measuring graduation which is scanned by a scanning unit 5 by scanning means well known to those skilled in the art and therefore not shown in detail in FIG. 1b. The processing or measuring machine includes a slide 6 to which is mounted by means of screws 7 a mounting base 8. This mounting base 8 defines a follower 9 which in turn defines a sword-shaped central section 10. This central section 10 extends through a longitudinal gap 12 in the housing 1. This gap 12 is closed around the central section 10 by means of sealing lips 11 which slope together in a roof-like form. Relative movement between the slide piece 6 and the bed 2 is transferred from the follower 9 by means of an angle lever 13 (FIG. 2) to the scanning unit 5.

The measuring system shown in the drawings includes an error correction system for correcting both division (graduation) errors of the scale 4 and guidance errors of the slide piece 6 with respect to the bed 2. This error correction system is arranged in the interior of the housing 1. A one-piece angular error correction profile 14 defines at predetermined spacings notches 15 which reduce the cross-sectional dimension of the error correction profile 14. In the vicinity of each of the notches 15 a respective adjusting element 16 is provided, in the form of an eccentric. These adjusting elements 16 operate to deflect the error correction profile 14 away from its straight line course transversely with respect to the measuring direction X in correspondence with the desired error correction course. The angle lever 13 is pivotably mounted about an axis 17 defined by the scanning unit 5. The angle lever 13 defines on its longer free end a roller 18. The roller 18 travels along the error correction profile 14, and displacement of the scanning unit 5 along the measuring direction X causes a pivoting movement of the angle lever 13 which follows the course of the error correction profile 14, and therefore the error correction course to be corrected. The actual error correction occurs by means of an eccentric 19 which is mounted on the shorter free end of the angle lever 13. This eccentric 19 is held against the follower 9 by means of a spring 20, and the eccentric 19 converts the swinging movement of the angle lever 13 into relative movement between the scanning unit 5 and the follower 9.

As shown in FIGS. 3a and 3b, each of the eccentrics 16 consists of a disc 16a which is rotatable in a bore 21 defined in a wall 33 of the housing 1. An eccentrically arranged projection 22 is mounted to the inner portion of each of the discs 16a. Each projection 22 engages an oblong hole 23 defined in the error correction profile 14 in order to deflect the error correction profile 14. The eccentrics 16 can be rotated for the purpose of adjusting the error correction profile 14. For this purpose, two depressions 24 are provided in the disc 16a, and these depressions 24 are accessible from the outside of the measuring system and are shaped and positioned to engage a turning tool (not shown). After completion of the adjustment of the error correction profile 14 in correspondence with the desired error correction course, the error correction profile 14 is fixed in place by means of screws 25. The screws 25 pass through bores 26 in the projections 22. Nuts 27 cooperate with the screws 25 and the eccentric projections 22 to fix the error correction profile 14 in position on the housing 1. A shank of the error correction profile 14 serves to prevent the nuts 27 from twisting in place. Since deflection of the error correction profile 14 by the eccentrics 16 changes the length of the error correction profile 14, There is provided on the outside face of the eccentric disc 16 an annular index mark carrier 28. This index mark carrier 28 defines an index mark M which is used for reproduceable error correction. The carrier 28 is inserted in a conical annular groove 30 defined by the disc 16a and is pressed in place by means of a plate spring 31 against the opening portion of the annular groove 30. The spring 31 serves to fix the carrier 28 in position. The index marks M are used in conjunction with a zero line N of an error correction scale 32. This error correction scale 32 is defined on a scale carrier 33 which in this embodiment takes the form of an outside surface of the housing 1 which houses the eccentric discs 16a.

After the error correction profile 14 has been adjusted by means of the eccentrics 16 in order to correct any graduation or division error of the graduation of the scale 4, in general at least a portion of the index marks M will deviate from the zero line N. In order to facilitate a subsequent adjustment of the error correction profile 14 by means of the eccentrics 16 to correct for guidance errors of the machine parts 2,6, all index marks M which deviate from the zero line N are repositioned to point to the zero line N by pressing the carriers 28 inwardly and turning the carriers 28 until the index marks M are precisely aligned with the zero line N. In this way, an exactly reproduceable and precise correction of guidance errors (for example with the aid of a previously measured record of guidance errors) can be accomplished with complete utilization of the error correction scale 32 on both sides of the zero line N. Furthermore, resettings (which may possibly become necessary at a later time due to increasing wear of the machine guides) can be made in a reproduceable and accurate manner. In an alternate embodiment of this invention the index mark carrier can be self-adhesive annular disc made for example of metal which is held in place by a suitable adhesive such that the disc can be removed and then replaced on the eccentric.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a measuring system of the type comprising a measuring scale coupled to a first object and extending along a measuring direction; a scanning unit positioned to scan the scale and coupled to a second object; and an error correction system comprising an error correction profile, at least one adjusting element for adjusting the position of the correction profile transversely to the measuring direction, a transfer element coupled between the scanning unit and the second object to vary the spacing therebetween in response to the profile, and an error correction scale positioned adjacent to the adjusting element; wherein the adjusting element moves with respect to the error correction scale during adjustment of the position of the correction profile; the imtion of the index mark carrier with respect to the adjusting element can be varied.

2. The invention of claim 1 wherein the index mark carrier comprises an annular ring and wherein the index mark carrier mounting means comprises means for defining a conical annular groove in the adjusting element, said groove sized to receive and clamp the annular ring.

3. The invention of claim 1 wherein the index mark carrier comprises an annular disc, and wherein the index mark carrier mounting means comprises an adhesive layer on the disc.

4. The invention of claim 1:
wherein the error correction scale defines a reference line; and
wherein the index mark carrier mounting means allows the index mark carrier to be shifted with respect to the adjusting member in order to allow the index mark to be aligned with the reference line, independently of the position of the adjusting member, in order to designate any selected one of a range of positions of the adjusting member as a reference position.

5. The invention of claim 1:
wherein the adjusting element comprises a first disc member mounted to the measuring system for rotation about a selected axis such that rotational adjustment of the adjusting member alters the position of the correction profile transversely to the measuring direction;
wherein the index mark carrier comprises a second disc member;
wherein the error correction scale defines a reference line; and
wherein the index mark carrier mounting means allows the second disc member to be rotated about the selected axis independently of the first disc member in order to allow the index mark to be aligned with the reference line, independently of the rotational position of the first disc member, in order to designate any selected one of a range of rotational positions of the first disc member as a reference position.

6. In a measuring system of the type comprising a measuring scale coupled to a first object and extending along a measuring direction; a scanning unit positioned to scan the scale and coupled to a second object; and an error correction system comprising means for adjusting the separation between the scanning unit and the second object; the improvement comprising:
an error correction scale mounted to the measuring system and defining a reference line;
an adjusting disc;
means for mounting the adjusting disc to the measuring system for rotation about a selected axis;
means for coupling the adjusting disc to the separation adjusting means such that rotation of the adjusting disc about the selected axis alters the separation between the scanning unit and the second object;
an index mark carrier disc which defines an index mark; and
means for rotatably mounting the index mark carrier disc to the adjusting disc such that the index mark carrier disc is rotatable about the selected axis independently of the adjusting disc;
said index mark positioned to cooperate with the error correction scale to indicate the relative angular position of the index mark; and
said index mark alignable with the reference line, independently of the angular position of the adjusting disc, in order to designate any selected one of a range of positions of the adjusting member as a reference position.

7. The invention of claim 6 wherein the index mark carrier disc comprises an annular ring and wherein the index mark carrier disc mounting means comprises means for defining a conical annular groove in the adjusting disc, said groove sized to receive and clamp the annular ring.

8. The invention of claim 6 wherein the index mark carrier disc comprises an annular disc, and wherein the index mark carrier disc mounting means comprises an adhesive layer on the disc.

* * * * *